United States Patent
Case et al.

(10) Patent No.: US 6,510,418 B1
(45) Date of Patent: Jan. 21, 2003

(54) METHOD AND APPARATUS FOR DETECTING AND DETERRING THE SUBMISSION OF SIMILAR OFFERS IN A COMMERCE SYSTEM

(75) Inventors: T. Scott Case, Darien, CT (US); Jay S. Walker, Ridgefield, CT (US); Daniel E. Tedesco, New Canaan, CT (US)

(73) Assignee: priceline.com Incorporated, Norwalk, CT (US)

( * ) Notice: Subject to any disclaimer, the term of this patent is extended or adjusted under 35 U.S.C. 154(b) by 0 days.

(21) Appl. No.: 09/224,907

(22) Filed: Jan. 4, 1999

Related U.S. Application Data

(63) Continuation-in-part of application No. 09/205,824, filed on Dec. 4, 1998, which is a continuation-in-part of application No. 08/943,483, filed on Oct. 3, 1997, which is a continuation-in-part of application No. 08/923,683, filed on Sep. 4, 1997, which is a continuation-in-part of application No. 08/889,319, filed on Jul. 8, 1997, which is a continuation-in-part of application No. 08/707,660, filed on Sep. 4, 1996, now Pat. No. 5,794,207.

(51) Int. Cl.$^7$ .............................................. G06F 17/60

(52) U.S. Cl. ........................................ 705/26; 705/37

(58) Field of Search ........................... 705/26, 27, 37, 705/14, 35, 400

(56) References Cited

U.S. PATENT DOCUMENTS

| | | | |
|---|---|---|---|
| 3,573,747 A | 4/1971 | Adams et al. | 705/37 |
| 4,247,759 A | 1/1981 | Yuris et al. | 235/381 |
| 4,449,186 A | 5/1984 | Kelly et al. | 705/5 |
| 4,553,222 A | 11/1985 | Kurland et al. | 705/15 |

(List continued on next page.)

FOREIGN PATENT DOCUMENTS

| | | |
|---|---|---|
| EP | 0 512 702 A2 | 11/1992 |
| EP | 512 702 A2 | 11/1992 |
| WO | 95/16971 | 6/1995 |
| WO | 96/13013 | 5/1996 |
| WO | 96/34356 | 10/1996 |
| WO | WO 97/16797 * | 5/1997 ........... G06F/17/60 |
| WO | 97/46961 | 12/1997 |
| WO | 98/10361 | 3/1998 |

OTHER PUBLICATIONS

Fishkin, Ken, Foresight Exchange Tutorial: (http://www.ideosphere.com/fx/docs/tutorial.html) Feb. 19, 1999 at p. 1–5.

(List continued on next page.)

Primary Examiner—James P. Trammell
Assistant Examiner—John W. Hayes
(74) Attorney, Agent, or Firm—Morgan & Finnegan LLP

(57) ABSTRACT

A system and method for processing buyer offers of products, to diminish the occurrence of similar, repetitive offers whereby buyers "ping" to determine a confidential floor price for the products. In one embodiment, a first offer is received from a buyer, the first offer including a plurality of offer terms each having a respective first value. A second offer is later received from the same party, the second offer including generally the same plurality of offer terms each having a respective second value. The invention operates to determine for each of the plurality of offer terms a corresponding unacceptable similarity range, and to compare the respective first values with the respective second values for each of the offer terms. If the respective first and second values for at least one of the plurality of offer terms fall within the unacceptable similarity range, a first selected process is performed on the second offer. For example, the offer may be rejected, taxed, or otherwise processed so as to discourage pinging. If the respective first and second values for the plurality of offer terms fall outside of the unacceptable similarity range, a second selected process is performed on the second offer. For example, the offer may be processed in an effort to identify a willing and able seller, in a conventional manner.

6 Claims, 10 Drawing Sheets

— 600

| BUYER OFFER CHARACTERISTIC IDENTIFIER 603 | BUYER OFFER CHARACTERISTICS 604 | TERM SIMILARITY RANGE 606 |
|---|---|---|
| 001 | SUBMISSION DATE | WITHIN 2 DAYS OF ORIGINAL OFFER DATES |
| 002 | PRICE | WITHIN $50.00 OF ORIGINAL OFFER PRICE |
| 003 | BUYER IDENTIFIER | IDENTICAL BUYER IDENTIFIERS |
| 004 | PAYMENT IDENTIFIER | IDENTICAL PAYMENT IDENTIFIERS |
| 005 | ITINERARY | SAME CITY PAIRS |

U.S. PATENT DOCUMENTS

| | | | |
|---|---|---|---|
| 4,677,552 A | 6/1987 | Sibley, Jr. ..................... | 705/37 |
| 4,751,728 A | 6/1988 | Treat .......................... | 379/113 |
| 4,789,928 A | 12/1988 | Fujisaki ....................... | 705/37 |
| 4,799,156 A | 1/1989 | Shavit et al. ................. | 705/26 |
| 4,903,201 A | 2/1990 | Wagner ........................ | 705/37 |
| 4,931,932 A | 6/1990 | Dalnekoff et al. ............. | 705/5 |
| 5,021,953 A | 6/1991 | Webber et al. ................. | 705/6 |
| 5,101,353 A | 3/1992 | Lupien et al. ................. | 705/37 |
| 5,136,501 A | 8/1992 | Silverman et al. ............ | 705/37 |
| 5,168,446 A | 12/1992 | Wiseman ..................... | 705/37 |
| 5,191,523 A | 3/1993 | Whitesage .................... | 705/6 |
| 5,191,613 A | 3/1993 | Graziano et al. ............. | 705/75 |
| 5,224,034 A | 6/1993 | Katz et al. ..................... | 705/7 |
| 5,243,515 A | 9/1993 | Lee ............................ | 705/37 |
| 5,253,165 A | 10/1993 | Leiseca et al. ................ | 705/5 |
| 5,262,941 A | 11/1993 | Saladin et al. ................ | 705/38 |
| 5,283,731 A | 2/1994 | Lalonde et al. ............... | 705/26 |
| 5,297,031 A | 3/1994 | Gutterman et al. ........... | 705/37 |
| 5,329,589 A | 7/1994 | Fraser et al. .................. | 705/18 |
| 5,361,199 A | 11/1994 | Shoquist et al. .............. | 705/26 |
| 5,375,055 A | 12/1994 | Togher et al. .............. | 364/408 |
| 5,404,291 A | 4/1995 | Kerr et al. ..................... | 705/5 |
| 5,420,914 A | 5/1995 | Blumhardt ................. | 379/114 |
| 5,426,281 A | 6/1995 | Abecassis ................... | 235/379 |
| 5,444,630 A | 8/1995 | Dlugos ........................ | 705/402 |
| 5,467,269 A | 11/1995 | Flaten ......................... | 705/14 |
| 5,500,793 A | 3/1996 | Deming, Jr. et al. .......... | 705/37 |
| 5,517,555 A | 5/1996 | Amadon et al. ............ | 455/408 |
| 5,519,769 A | 5/1996 | Weinberger, et al. ....... | 379/112 |
| 5,553,131 A | 9/1996 | Minervino, Jr., et al. ... | 379/221 |
| 5,557,517 A | 9/1996 | Daughterty, III ............. | 705/37 |
| 5,557,518 A | 9/1996 | Rosen ......................... | 705/69 |
| 5,570,283 A | 10/1996 | Shoolery, et al. .............. | 705/5 |
| 5,592,375 A | 1/1997 | Salmon et al. ................. | 705/7 |
| 5,606,602 A | 2/1997 | Johnson et al. ............. | 379/115 |
| 5,611,052 A | 3/1997 | Dykstra et al. ............... | 705/38 |
| 5,615,269 A | 3/1997 | Micali ......................... | 705/80 |
| 5,640,390 A | 6/1997 | Sakamoto et al. .......... | 370/346 |
| 5,664,115 A | 9/1997 | Fraser ......................... | 705/37 |
| 5,689,652 A | 11/1997 | Lupien et al. ................ | 705/37 |
| 5,694,551 A | 12/1997 | Doyle et al. .................. | 705/26 |
| 5,696,965 A | 12/1997 | Dedrick ....................... | 705/26 |
| 5,717,989 A | 2/1998 | Tozzoli et al. ................ | 705/37 |
| 5,732,400 A | 3/1998 | Mandler et al. ............. | 705/26 |
| 5,745,882 A | 4/1998 | Bixler et al. .................. | 705/26 |
| 5,757,917 A | 5/1998 | Rose et al. ................... | 705/79 |
| 5,758,328 A | 5/1998 | Giovannoli ................... | 705/26 |
| 5,794,207 A | 8/1998 | Walker et al. ................ | 705/26 |
| 5,794,219 A | 8/1998 | Brown ........................ | 705/37 |
| 5,797,127 A | 8/1998 | Walker et al. ................. | 705/5 |
| 5,799,285 A | 8/1998 | Klingman ..................... | 705/26 |
| 5,822,737 A | 10/1998 | Ogram ........................ | 705/26 |
| 5,826,244 A | 10/1998 | Huberman ................... | 705/37 |
| 5,832,452 A | 11/1998 | Schneider et al. ............. | 705/5 |
| 5,835,896 A | 11/1998 | Fisher et al. .................. | 705/37 |
| 5,845,265 A | 12/1998 | Woolston ..................... | 705/37 |
| 5,924,083 A | * 7/1999 | Silverman et al. ............ | 705/37 |
| 6,012,045 A | * 1/2000 | Barzilai et al. ............... | 705/37 |
| 6,026,383 A | * 2/2000 | Ausubel ...................... | 705/37 |
| 6,041,308 A | * 3/2000 | Walker et al. ................ | 705/14 |
| 6,108,642 A | * 8/2000 | Findley ....................... | 705/26 |

OTHER PUBLICATIONS

"Bid.com 1998 Third–Quarter Revenue Increases 12.5 Percent From Second Quarter", Business Wire, Oct. 29, 1998.

Final Report: Virtual Hospital (http://www.telemed.medadmin.uiowa.edu/TRCDocs/Pubs/FinalReport/cVirtualH/virtualH/virtualh02.html), download date: Sep. 20, 1998.

"First Source Become a Member", More Reasons To Join First Source! (http://www.fsource.com/bene.html), download date: Sep. 20, 1998.

Jeffrey Davis, "Big Storm rising", Business 2.0, Sep., 1998 at p. 60.

Suite 101.com (http://www.suite101.com/doc.cfm.presskit/questions), 1998.

Web Marketing Today (http://www.wilsonweb.com/rfwilson/wmt2/issue36htm) dated Sep. 1, 1997, download date: Sep. 17, 1998.

"Free Stuff Internet Delivers for Viewers and Advertisers Alike", Press Release of PromoNet Interactive, Inc. dated Nov. 10, 1997.

About Iao, selected pages downloaded from www.iaoauction.com on Sep. 8, 1997 and Sep. 18, 1997.

Onsale: Auction Supersite, selected pages downloaded from www.onsale.com on Sep. 8, 1997.

Hapgood, Fred 'bidder Harvest, Sep. 1997, p. 58.

NASDAQ: What is NASDAQ?, selected pages downloaded from http://home.axford.com on Aug. 15, 1997.

NASDAQ Consolidated Subscriber Agreement, downloaded from www.pcquote.com/exchanges on Aug. 15, 1997.

Trading Floor: General Trading Information and Terms, downloaded from www.tradingfloor.com on Aug. 14, 1997.

HomeShark: Refinance Check, selected pages downloaded from www.homeshark.com on Aug. 13, 1997.

The Loan Process, downloaded from www.sdtech.com/mls/process on Aug. 7, 1997.

Trade–Direct: We Help You Trade With Confidence, selected pages downloaded from www.trade–direct.com on Aug. 6, 1997.

Classifieds2000: The Internet Classifieds, selected pages downloaded from www.classifieds2000.com on Aug. 6, 1997.

Internet Mortgage Service Eliminates Loan Agents and Passes Commissions on to the Consumer, Company Press Release, Yahoo Business Wire (Jun. 30, 1997).

Frequently Asked Questions About: Airhitch, selected pages downloaded from www.isicomm.com.fr/airhitch on May 6, 1997.

Hitch a Flight to Europe, selected pages downloaded from www.travelassist.com on May 6, 1997.

Airhitch: Your Way to Low Cost Travel, selected pages downloaded from www.vaportrails.com on May 6, 1997.

Kelsey, J. and Schneier, B., Conditional Purchase Orders, $4^{th}$ ACM Conference on Computer Communications Security, ACM Press, 117–124 (Apr. 1997).

Bryant, Adam, "Shaking Up Air Fares' Status Quo", The New York Times, Mar. 31, 1997.

Silverman, Robert, "GM Drives Web Ad Insertion Network", Inside Media, Feb. 26, 1997, vol. 9, No. 4, p. 1; ISSN:1046–5316.

"Flycast Introduces Unique 'Open Exchange' Match–Making Service", Interactive Marketing News, Feb. 21, 1997, vol. 4, No. 8.

"UK's World Telecom Unveils New WorldSaver Tariffs," Newsbytes, Information Access Company (Feb. 13, 1997).

"TransQuest and Web Ventures Deliver Internet Booking for Delta Air Lines", PR Newswire, Dec. 10, 1996, Financial News Section.

"Affinicast Enables Web Sites That Listen and Adapt to Customer Affinities", PR Newswire, Dec. 3, 1996.

"Web Ventures Presents BookIt!" press release printed from http://www/webventures.com/bookit/(Web Ventures World Wide Web site) on Dec. 2, 1996.

"World's First Real–Time Travel Auction Service to Be Available Via World Wide Web: ETA To Open Bidding to Consumers," Business Wire, DIALOG Trade & Industry Database (Nov. 4, 1996).

Gessel, Chris, "Trade Smarter: The Limit of Orders", Investor's Business Daily, Oct. 14, 1996, p. A1.

CREST: Cruise/Ferry Revenue Management System, selected pages downloaded from www.rtscorp.com on Aug. 5, 1996.

Nishimoto, Lisa, "Travel Services Are First Online Commerce Offerings to Fly," Infoworld, Jul. 29, 1996, downloaded from http://www.infoworld.com.

About Rate Hunter, dowloaded from http://207.49.64.77/rhprodrh.htm on Jul. 14, 1996.

Cathay Pacific Online Ticket Bidding, World Internet News Digest (May 8, 1996).

Sothbey's General Information, downloaded from www-.sothebys.com (1996).

CyberBid, Net Fun Ltd.(1996).

Nimmer, Raymond, T., "Electronic Contracting; Legal Issues", 14 J. Marshall J.Computer & Info L.211, Winter, 1996.

American Law Institute, Draft–Uniform Commercial Code Revised Article 2 (Sales), parts 2, 3, and 7, pp. 1–15, Jan. 4, 1996.

Speidel, Richard E. & Schott, Lee A., "Impact of Electronic Contracting on Contract Formation Under Revised UCC Article 2, Sales",C78 ALI–ABA 335, Dec. 9, 1993.

Hainer, Cathy and Grossman,Cathy Lynn, "Where Vacationing Kids Get Good Care", USA Today, Apr. 1, 1992, at p. 4D.

Del Russo, Laura, "Ticket–Bidding Firm Closes Its Door," Travel Weekly, Mar. 12, 1992.

"Newsletters", The Atlanta Constitution, Mar. 1, 1992, p. K13.

"CRTL's Blue Ribbon Deals for 1992", Consumer Reports Travel Letter, Jan. 1992, vol. 8, No. 1, at pp. 3–5.

Traveler's Notes; Bookit Report, Consumer Reports Travel Letter, Dec. 1991 at p. 143.

Feldman, Joan M., "To Rein In Those CRSs; Computer Reservation Systems", Air Transport World, Dec. 1991, at p. 89.

"Money Briefs; Buy Low, Fly High", Gannet News Service, Nov. 20, 1991.

"Buy Low, Fly High", USA Today, Nov. 14, 1991 at p. 15.

Traveler's Notes; Easier Airfare Bidding, Consumer Reports Travel Letter, Oct. 1991 at p. 119.

Nelson, Janet "Practical Traveler; Airlines Relaxing Policy on No–Refund Tickets", The New York Times, Sep. 22, 1991 at p. 3 of Section 5.

Pelline, Jeff, "News Service; Now You Can Make a Bid on Your Next Airline Ticket Home", The Orange County Register, Sep. 1, 1991 at p. E01.

"Bookit Airfare Bidding System (Fax for Your Plane Ticket?)", Consumer Reports Travel Letter, Sep. 1991, pp. 97 & 106.

Upton, Kim "French Say Monoliths Off–limits to Visitors", Los Angeles Times, Aug. 25, 1991.

Pelline, Jeff, "Travelers Bidding on Airline Tickets; SF Firm Offers Chance for Cut–Rate Fares", San Francisco Chronicle, Section A4, Aug. 19, 1991.

Carey, Christopher, "Firm Offers Auction For Airline Tickets", St. Louis Post–Dispatch, Aug. 7, 1991 at p. 1B.

Del Rosso, Laura, "Marketel Says It Plans to Launch Air Fare 'Auction' in June", Travel Weekly, Apr. 29, 1991.

NASDAQ Adds Enhancements to SOES Limit Order File, Securities Week, Nov. 26, 1990, p. 5.

Ritter, Jeffrey B., "Scope of the Uniform Commercial Code: Computer Contracting Cases and Electrical Commercial Practices", 45 Bus. Law 2533, Aug. 1990.

Greenburg, Peter, S., "Judging DeRegulation", The Record, Jul. 22, 1990 at p. T01.

Greenburg, Peter, S., "The Savvy Traveler: Lower Air Fares for Consumers Not in the Cards; Airlines: Remember When It Cost $16 to fly from Lost Angeles to San Francisco? Then You Remember the Days Before DeRegulation. Since Then, Prices Have Soared", Los Angeles Times, Jul. 8, 1990 at p. L2.

Wallace, David, "Company Planning to Let Fliers Bid on Airfares", Philadelphia Business Journal, Mar. 26, 1990 at p. 15.

"Letter to Business Extra", The San Francisco Chronicle, Dec. 26, 1989 at p. C7.

Schrage, Michael, "An Experiment in Economic Theory; Labs Testing Real Markets", The Record Section B1, Nov. 26, 1989.

Schrage, Michael Innovation/Micheal Schrage: Laboratory Experiments with Market Economics, Los Angeles Times, Nov. 23, 1989 at p. D1.

Golden, Fran "AAL's Riga Doubts Marketel's Appeal to Retailers", Travel Weekly, Nov. 13, 1989.

Del Rosso, Laura, Firm Proposes ticket–bidding system; Marketel explores electronic auction of travel; Marketel International., Travel Weekly, Section No. 91, vol. 48, p. 1; Nov. 13, 1989.

Carlsen, Clifford, "Polaris Group Set to Fly the Leveraged Sky", San Francisco Business Times, Nov. 6, 1989 at p. 1.

Kuttner, Robert, "Computers May Turn the World into One Big Commodities Pit", Business Week, Sep. 11, 1989.

Carlsen, Clifford, "From Airline Tickets to Human Organs, the Electronic Markets Are Booming", San Francisco Business Times, Aug. 14, 1989 at p. 17.

"Public May Submit Bids To Get Bargain Rates", Wall Street Journal, Section 2; p. 1, Column 1; Aug. 1, 1989.

American Airlines Internet Silent Auction, selected pages downloaded from www.americanair.com.

Apollo Host Computer, selected pages downloaded from www.appollo.com.

"Auctioning unsold airline tickets." (http://www.new-civ.org/GIB/BOV/BV–409.HTMI), at p. 1.

Cathay Pacific:CyberTraveler Auction #3—Official Rules, selected pages downloaded from www.cathaypacific.com.

CSM Online: About Collector's Super Mall downloaded from www.csmonline.com.

Sabre Decision Technologies, selected pages downloaded from www.sabre.com.

PhoneMiser: Frequently Asked Questions, downloaded from www.phonemiser.com.

The United Computer Exchange: How It All Works, selected pages downloaded from www.uce.com.

Tired of Shopping For the Best Home Loan?, Mortgage Loan Specialists.

Koepper, Ken, "Room Inventory Auctioning: The Next CRS Generation", Lodging, Jan. 1990 at p. 26, 29–30.

Hensley, H.G., "I'll Take Jarez," *Travel Weekly,* vol. 45, p. 7, Feb. 1986.

Gibson, R., et al., "Marketing:Fast–Food Chains Hope Diners Swallow New 'Value' Menu of Higher–Priced Items," *The Wall Street Journal,* Mar. 13, 1992, p. B1.

Anonymous, "Another Reason to Love Those Afluent Customers," *Jewelers' Circular—Keystone,* vol. CLXX, No. 7, p. 64, Jul. 1999.

* cited by examiner

| SELLER IDENTIFIER 302 | SELLER NAME 304 | SELLER CONTACT INFORMATION 306 | SELLER AGENT STATUS 308 |
|---|---|---|---|
| 1231 | AIRLINE 1 | E-ADDRESS#1 | N |
| 1232 | AIRLINE 2 | DBASEADDRESS#2 | Y |
| 1233 | AIRLINE 3 | E-ADDRESS#3 | N |
| 1234 | AIRLINE 4 | DBASEADDRESS#4 | Y |

300A → (row 1231)
300B → (row 1232)
300C → (row 1233)
300D → (row 1234)

FIG. 3

| BUYER IDENTIFIER 404 | FINANCIAL ACCOUNT IDENTIFIER 406 | BUYER NAME 408 | BUYER CONTACT INFORMATION 410 |
|---|---|---|---|
| 4567 | 1111-1111-1111-1111 | JOE SMITH | SMITH@ISP.COM |
| 6789 | 2222-2222-2222-2222 | SUE JOHNSON | JOHNSON@SCHOOL.EDU |

400

402A → (row 1)
402B → (row 2)

FIG. 4

| BUYER OFFER IDENTIFIER 504 | BUYER IDENTIFIER 506 | BUYER OFFER CONDITIONS 508 | PRICE 510 | SUBMISSION DATE/TIME 512 | EXPIRATION DATE/TIME 514 |
|---|---|---|---|---|---|
| 1 | 4567 | -NY - LA R/T<br>-LEAVE 1/15/98<br>-RETURN 1/19/98 | $200.00 | 1/1/98 | 1/14/98 |
| 2 | 4567 | -NY - LA R/T<br>-LEAVE 1/10/98<br>-RETURN 1/19/98 | $400.00 | 1/1/98 | 1/9/98 |
| 3 | 6789 | -ORL - SF R/T<br>-LEAVE 1/25/98<br>RETURN 1/29/98 | $350.00 | 1/1/98 | 1/1/98 |

FIG. 5

| RULE IDENTIFIER 654 | TERM SIMILARITY RANGE IDENTIFIERS 656 |
|---|---|
| 001 | 602C ∧ 602B ∧ 602E |
| 002 | 602D ∧ 602B ∧ 602E |
| 003 | (602C ∨ 602D) ∧ (602E ∧ 602A) |
| 004 | (602C ∨ 602D) ∧ 602B ∧ 602E |

650

652A → (row 001)
652B → (row 002)
652C → (row 003)
652D → (row 004)

FIG. 6B

METHOD AND APPARATUS FOR DETECTING AND DETERRING THE SUBMISSION OF SIMILAR OFFERS IN A COMMERCE SYSTEM

The present application is a continuation-in-part of U.S. patent application Ser. No. 09/205,824 filed Dec. 4, 1998, which is a continuation-in-part of U.S. patent application Ser. No. 08/943,483 filed Oct. 3, 1997, which is a continuation-in-part of U.S. patent application Ser. No. 08/923,683 filed Sep. 4, 1997, which is a continuation-in-part of U.S. patent application Ser. No. 08/889,319, filed Jul. 8, 1997, which is a continuation-in-part of U.S. patent application Serial No. 08/707,660, filed Sep. 4, 1996, now issued U.S. Pat. No. 5,794,207, each of which is incorporated in its entirety by reference herein.

FIELD OF THE INVENTION

The present invention relates generally to commerce systems, and more particularly to a commerce system that discourages buyers from submitting repetitive offers for a product to determine a selling price.

BACKGROUND OF THE INVENTION

Most conventional systems for selling products are seller-driven commerce systems, wherein a seller establishes conditions, including price, for the sale of a product, and buyers determine whether or not to purchase that product. Examples of seller-driven commerce systems include conventional retail systems, both in a traditional store environment, and in an electronic environment as established on the Internet. Amazon.com, for example, is representative of a traditional seller-driven commerce system, i.e. a bookstore, that has been implemented electronically on the Internet. It is the applicant's belief that the vast majority of consumer sales are transacted using the seller-driven model.

A heretofore less common method of selling products is buyer-driven commerce, where a buyer creates an offer setting the terms and conditions of a potential purchase. The buyer offer is made available to many sellers, for example through a paper or electronic 'want ad,' and interested sellers may contact the buyer to complete the transaction.

While much infrastructure has long been established to support seller-driven commerce, buyer-driven commerce represents a somewhat newer, lesser used type of commerce having much less supporting infrastructure. Prior to the existence of electronic networks such as the Internet, and certain business models developed thereunder, applicant's believe no cost-effective infrastructure existed for supporting buyer-driven commerce systems. Facilities for supporting seller-driven commerce include, for example, highly-effective advertising channels, automated payment processing systems, established and readily available fulfillment systems, and other similar facilities for supporting steps of the seller-driven sales process. In contrast, many of the analogous facilities necessary to support buyer-driven commerce do not exist on the same established, economically feasible and effective scale.

Communications and advertising channels through which buyers may reach sellers are not, for example, as well established and effective as are the communications and advertising channels available for sellers to reach buyers. Similarly, it is typically more difficult and time-consuming for a seller to contact a buyer, consummate a transaction, and collect a payment based on a buyer-driven offer, than it is for a seller to perform these same functions in a more traditional seller-driven commerce environment. The development of electronic networks, as well as the invention of new commerce models and infrastructures using these networks, have moved towards making the process of buyer-driven commerce more practical and economically feasible on a large-scale basis.

Priceline.com Incorporated of Stamford, Conn. is a merchant that has successfully implemented a buyer-driven commerce system for the sale of products such as airline tickets, hotel accommodations, and automobiles. Priceline.com utilizes a Conditional Purchase Offer (CPO) Management System, described in U.S. Pat. No. 5,794,207 and International Application Number PCT/US97/15492, that processes buyer-generated conditional purchase offers (CPOs) received from individual consumers. These CPOs contain one or more buyer-defined conditions for the purchase of goods or services, at a buyer-defined price. They may be guaranteed by a general purpose account, such as a debit or credit card account, thereby providing sellers with a mechanism for collecting payments on accepted CPOs. The CPO Management System operates to automatically process CPOs for potential fulfillment by a seller. Automated processing systems developed by priceline.com make the buyer-driven commerce system cost-effective on a large scale. The potential to receive customer offers backed by credit cards, i.e. "guaranteed demand", makes the system very effective for sellers. If a seller accepts a CPO, the CPO Management System may bind the buyer on behalf of the accepting seller, to form a legally binding contract between the parties.

The CPO Management System thus empowers individual consumers to obtain goods and services at their own specified prices. The CPO Management System provides numerous commercial advantages to sellers as well. For example, certain features of the system, including anonymity and data security, enable the seller to adjust his price and terms to meet a consumer offer without publicly undercutting his own retail price structure. This enables the seller to identify and accept incremental, price-sensitive sales in a manner not typically feasible through a conventional retail process.

In many implementations of the above-described buyer-driven commerce system, it is important that a seller's lowest price, or floor price, remain a secret from the buyer. If the general buyer population discovers the seller's floor price, then there is no incentive for any buyer to offer a reasonable price for those products. Every buyer will eventually offer only the floor price, the seller's traditional retail prices and distribution channels will be undercut, and that seller may suffer or fail in the marketplace. Further, public knowledge of a seller's floor price will enable his competitors to determine his profit margins on particular goods, providing his competitors with an unfair advantage and an opportunity to undercut his position in the market.

One problem foreseen by the inventors is the likelihood that buyers (including competitors) may attempt to determine a seller's lowest price is to 'ping' the system by submitting repetitive offers to the system with incrementally increasing prices. For example, if a buyer believes a seller's floor price to be in the range of ten to fifteen dollars for a particular product, he may submit a first offer at nine dollars. If that offer is rejected, he would then submit subsequent offers, increasing the offer price incrementally (for example by one dollar), until an offer is accepted. At that time, the buyer knows the seller's lowest price, and may communicate that price to competitors and to other potential buyers.

The present inventors have thus determined that, in order for at least some methods of buyer-driven commerce to operate successfully, it is necessary to develop methods and systems for preventing buyers from determining lowest available seller prices. It is particularly desirable to prevent buyers from pinging the system to make such a determination.

SUMMARY OF THE INVENTION

A principle object of the present invention is to provide a system and method whereby buyer users of a buyer-driven commerce system are effectively discouraged from submitting repetitive offers in an effort to determine a lowest seller price for a particular product.

In accordance with a first embodiment of the present invention, there is provided a system and method of processing offers for the purchase of products, the method comprising the steps of: receiving from a party at least first and second offers for a product; comparing the first and second offers; and if the first and second offers fall within a predetermined range of similarity, then performing a first selected process on at least one of the first and second offers.

In accordance with another aspect of the invention, there is provided a system and method of processing offers for the purchase of products, the method comprising the steps of: receiving from a party a first offer, the first offer including a plurality of offer terms each having a respective first value; receiving from the party a second offer, the second offer including the plurality of offer terms each having a respective second value; determining for each of the plurality of offer terms a corresponding unacceptable similarity range; comparing the respective first values with the respective second values for each of the offer terms; and performing, if the respective first and second values for at least one of the plurality of offer terms fall within the unacceptable similarity range, a first selected process on the second offer.

In accordance with yet another embodiment of practicing the invention, there is provided a system and method of processing offers for the purchase of products, the method comprising the steps of: receiving from a party a first conditional purchase offer, the first conditional purchase offer including a plurality of offer terms each having a respective first value; receiving from the party a second conditional purchase offer, the second conditional purchase offer including the plurality of offer terms each having a respective second value; the plurality of offer terms including a condition, a purchase price, a payment identifier, and an authorization to use the payment identifier to pay the purchase price; determining for each of the plurality of offer terms an unacceptable similarity range; comparing the respective first values with the respective second values for each of the offer terms; if the respective first and second values for at least one of the plurality of offer terms fall within the unacceptable similarity range, performing a first process on the second offer; and if the respective first and second values for the plurality of offer terms do not fall within the unacceptable similarity range, performing a second process on the second offer.

BRIEF DESCRIPTION OF THE DRAWING FIGURES

These, and other objects, features and advantages of the invention will become apparent from a consideration of the detailed description below, in which:

FIG. 3 is a table showing the data contents of an exemplary seller database;

FIG. 4 is a table showing the data contents of an exemplary buyer database;

FIG. 5 is a table showing the data contents of an exemplary buyer offer database;

FIG. 6B is a table showing the data contents of an exemplary unacceptable similarity rules database;

Figure 7A:
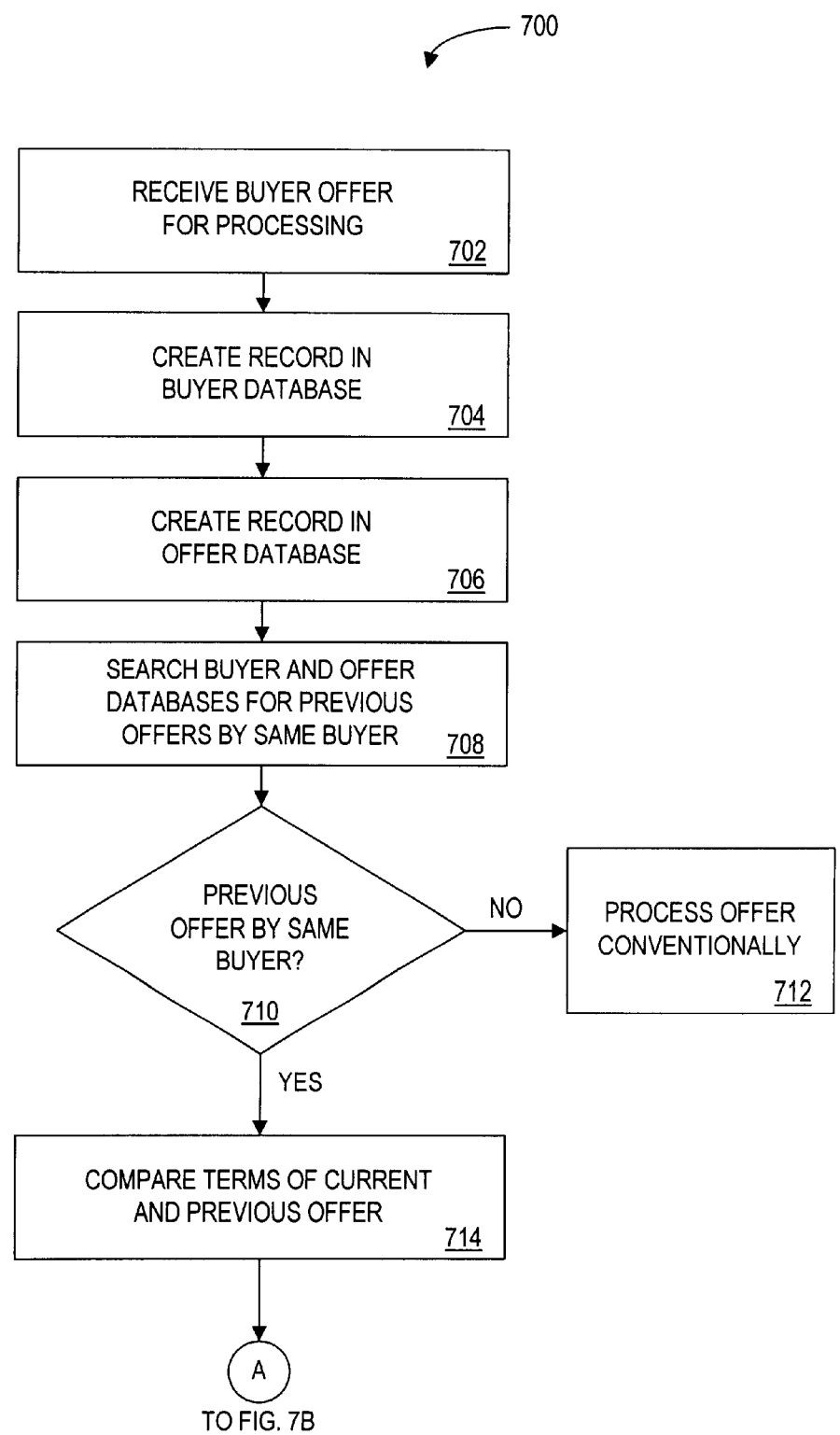
Figure 8:
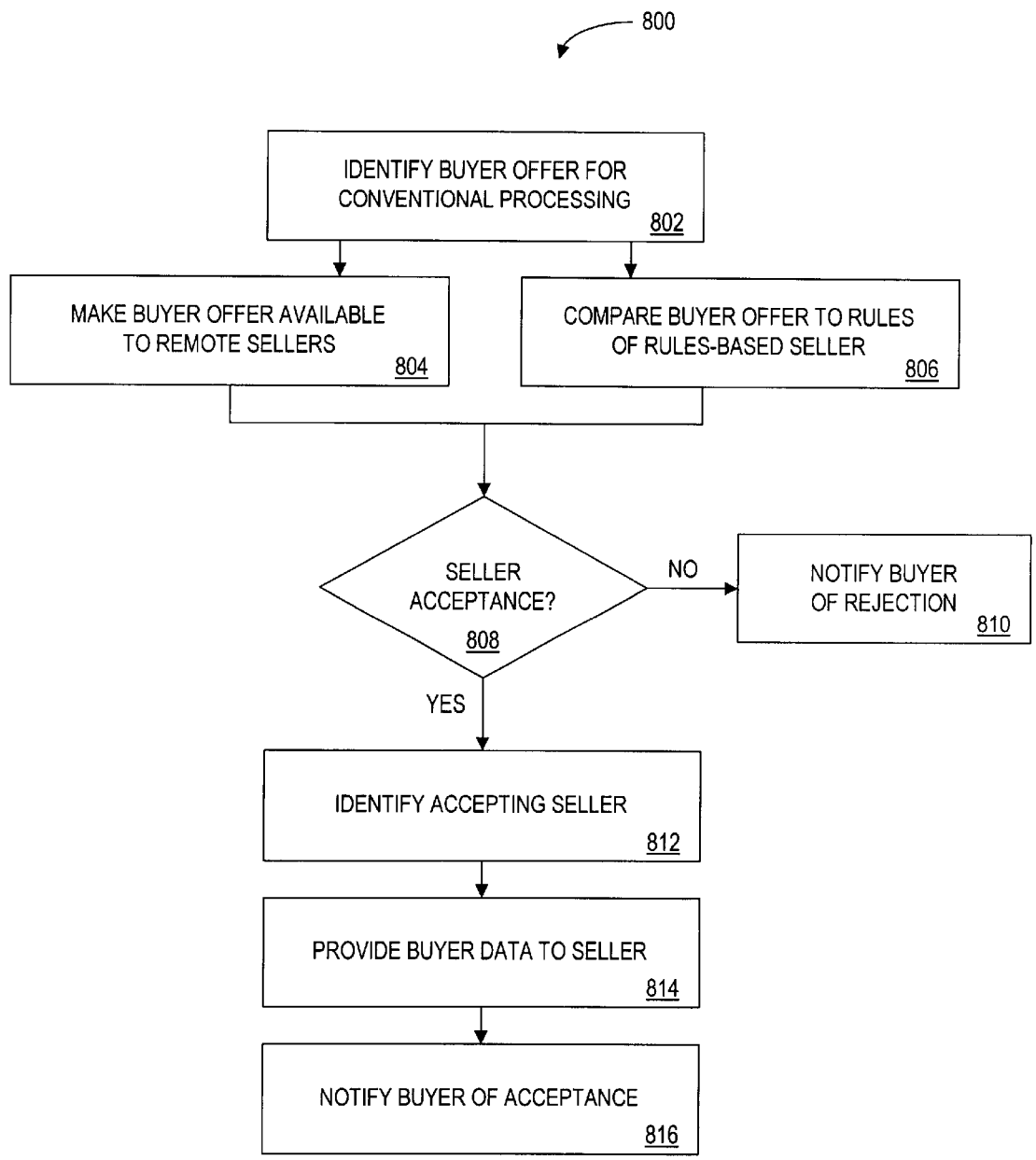

FIGS. 7A&B together show a flow chart showing an exemplary rules evaluation process; and FIG. 8 is a flow chart showing an exemplary CPO evaluation process.

DETAILED DESCRIPTION OF THE INVENTION

The present invention has application in the field of buyer-driven commerce, used herein to described methods of commerce wherein buyers assemble and submit offers to sellers, the sellers having the opportunity to consider and fill the offer. Fulfillment typically occurs after discussions with the buyer, during which payment mechanisms and fulfillment terms (i.e. delivery) are agreed to. One traditional method of buyer-driven commerce is the 'want ad,' which may be implemented today both electronically and in paper publications.

The present invention is operative to discourage buyer efforts to determine confidential price floors set by sellers. The invention is particularly effective in discouraging "pinging," used herein to describe a method whereby users of a system repetitively interact with that system in order to determine confidential information relating to the system. Such interactions can be on a large-scale basis, for example in the millions of interactions, in attempts to determine cryptographic protocols. The present invention is particularly concerned with the submission of repetitive buyer offers to a buyer-driven commerce system in order to attempt to determine a confidential price floor of a seller.

An important subset of buyer-driven commerce is the priceline.com model using conditional purchase offers (CPOs). A conditional purchase offer is a buyer offer that contains at the least a buyer-specified condition for the purchase of a product, and a buyer-specified price. A conditional purchase order desirably has some financial obligation on the part of the buyer associated with it, for example a penalty for failure to execute on an offer accepted by a seller. A conditional purchase offer may also be binding, wherein a buyer at the time of offer commits to pay his offer price if a seller accepts the offer. Binding CPOs are typically guaranteed with a financial account identifier, for example a credit or debit card account number. The inclusion of a payment guarantee raises the buyer offer, or demand unit, to the level of "guaranteed demand," making the offer less risky and hence more cost-effective for a seller to consider.

Other features that are applicable to the CPO model include the provision of anonymity to a seller, and the provision of flexible terms and conditions in the buyer's CPO. By making the seller's identity anonymous, at least until the seller accepts an offer, sellers may participate in the system with a much diminished concern about undercutting their own retail structure. By requiring the buyer offer to include flexible terms, terms that may be specified by the seller (i.e. delivery date, quality, brand name, etc . . . ), the seller is again given the ability to fill the offer with lessened concern about undercutting their own retail structure.

Figure 1:
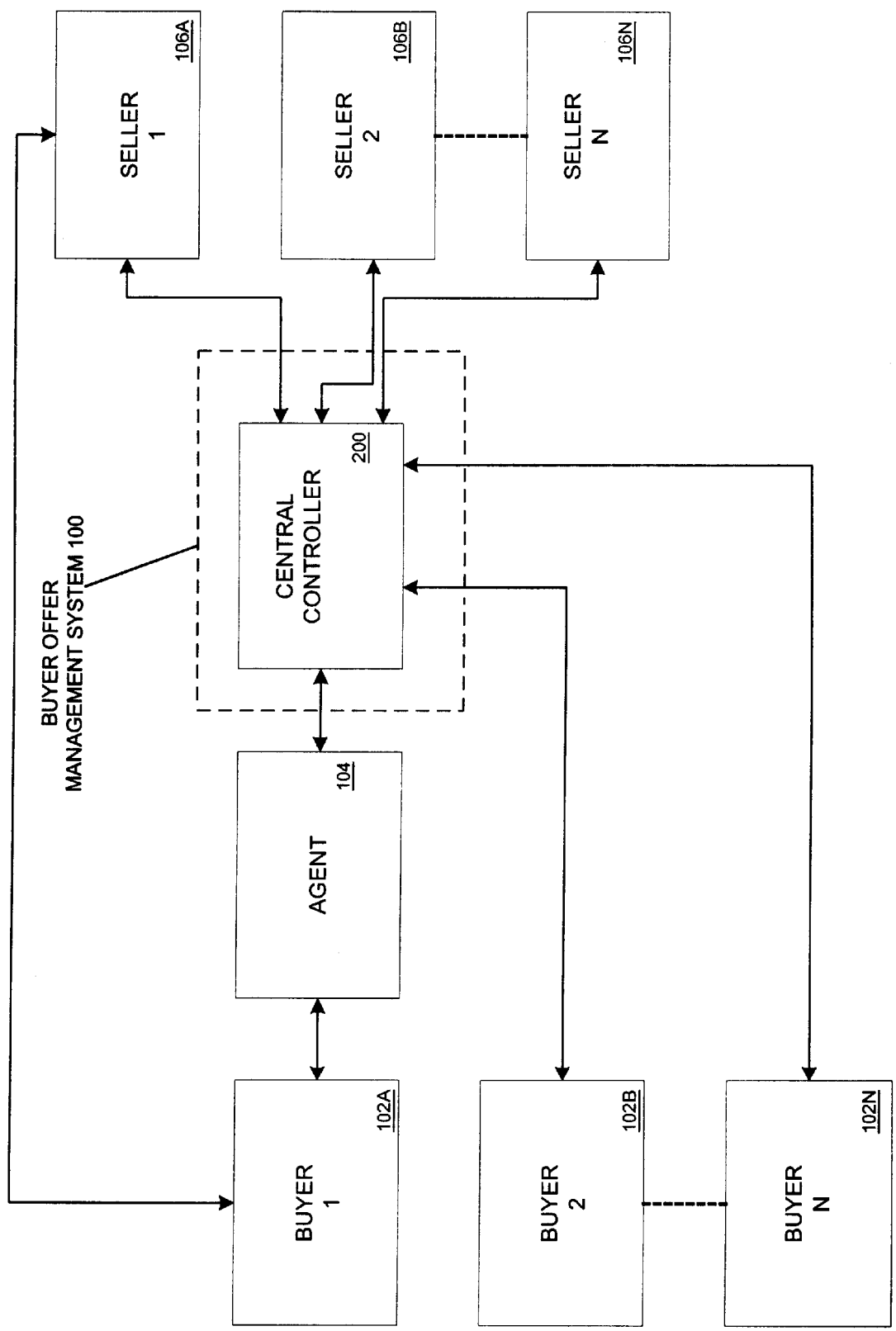
FIG. 1 is a block diagram of a CPO Management System in accordance with the invention.

Referring now to FIG. 1, there is shown a buyer offer management system 100 including a central controller 200 for communicating buyer offers and buyer offer-related information with a plurality of buyers 102A–102N, and communicating buyer offer and seller acceptance-related information with a plurality of sellers 106A–106N. Buyer offers and related information may be communicated by any appropriate means, for example, through an electronic network, by telephone, or by mail. Buyer offers may be received directly from a buyer, or through an agent 104 on behalf of a buyer, the agent shown herein as operating with buyer 102A.

In the described embodiment, buyers communicate with central controller 200 electronically via the Internet, and the central controller in turn communicates with sellers through an appropriate electronic data interface. Buyers 102A–102N would thus communicate with central controller 200 using an appropriate electronic terminal, for example a personal computer. Sellers 106A–106N likewise communicate with the central controller 200 through an appropriate computer, for example a personal computer, a server, or a main-frame computer. As will be discussed further below, selected sellers receive buyer offers directly from central controller 200, while other sellers provide agency-based rules for use by the central controller to itself evaluate buyer offers on behalf of such sellers.

Figure 2:
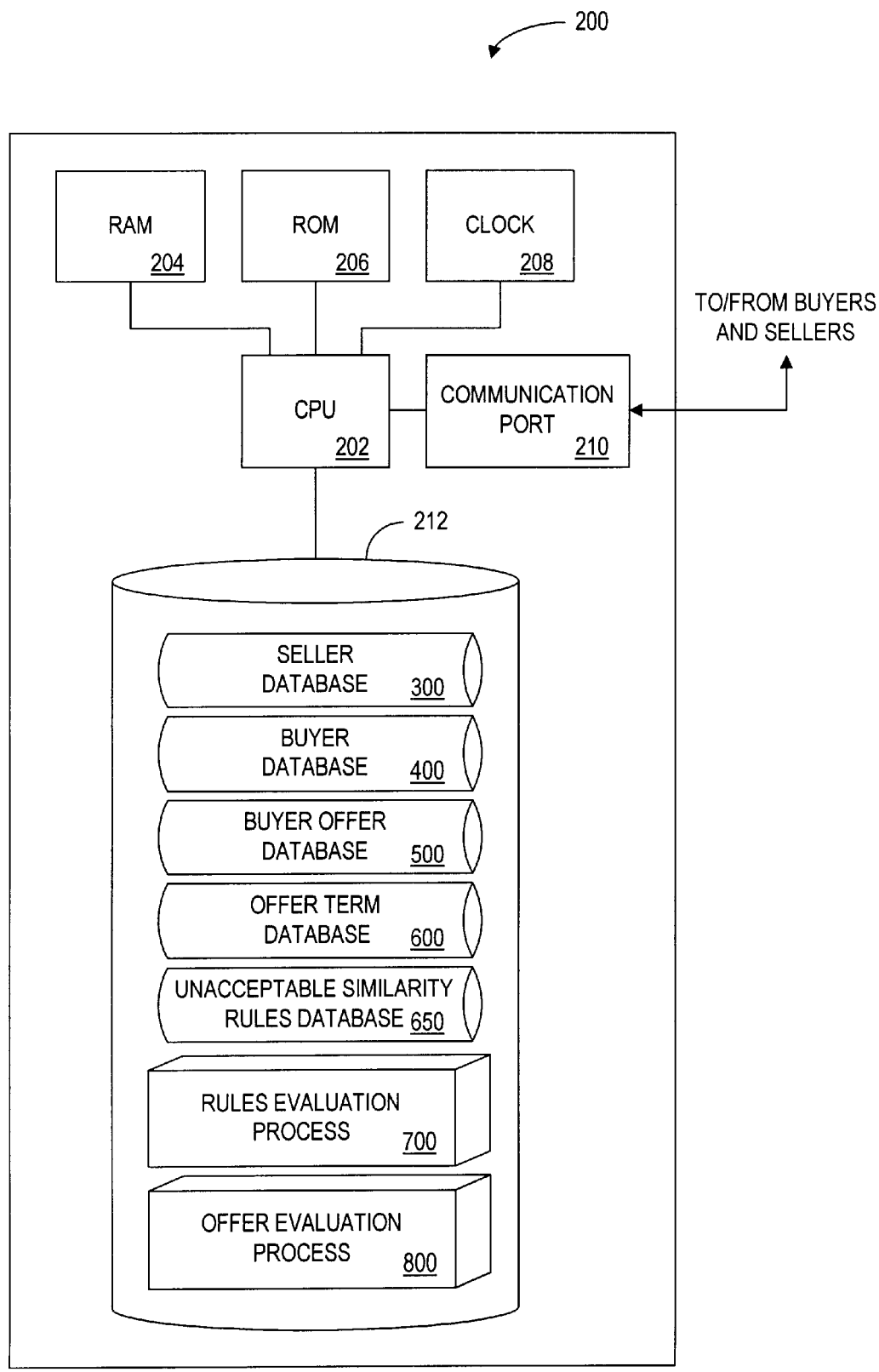
FIG. 2 is a block diagram of the central controller of FIG. 1.

With reference now to FIG. 2, central controller 200 is seen to comprise a generally conventional computer, including a central processing unit (CPU) 202 connected to random access memory 204, read-only memory 206, and a clock 208. CPU 202 is further connected to a communications port 210, such as a modem or a network interface, and a storage device 212. Storage device 212 can comprise, for example, a conventional combination of magnetic, optical, and/or semiconductor memory.

In accordance with the present invention, storage device 212 is seen to include a seller database 300, a buyer database 400, an offer database 500, an offer term database 600, and an unacceptable similarity rules database 650, each of which is described in further detail below. Storage device 212 further includes software instructions for performing a rules evaluation process 700 and an offer evaluation process 800, each of which are also described in further detail below. Central controller 200 further includes those standard hardware and software components necessary to the operation of a computer, as are well known to those of ordinary skill in the art.

Referring now to FIG. 3, seller database 300 is seen to include four data records, indicated at 300A–300D. Each data record includes four data fields: a seller identifier field 302 containing an identifier assigned by central controller 200, a seller name field 304 including an alpha-numeric seller name, a seller contact information field 306 indicating an address or other method of communicating information with a seller, and a seller agent status field 308 indicating whether the seller has provided rules for local evaluation of a buyer offer by the central controller. Examining, for example, record 300A, Airline 1 is seen to be associated with identifier 1231 and to have an electronic contact address of 'E-ADDRESS#1'. The seller agent status is "no," indicating the seller has not provided rules for local evaluation of buyer offers, and is thus to have direct access to buyer offers in the manner described below. In contrast, Airline 2 as identified in data record 300B is seen to have provided buyer offer evaluation rules, which are available for use at a local database address "DBASE-ADDRESS#2." Though Dot shown, an external contact address or information may also be provided for Airline 2.

With reference now to FIG. 4, there is shown buyer database 400 including two data records 402A, 402B, each including four fields: a buyer identifier field 404 including an identifier either generated by central controller 200 or provided by a buyer (e.g. a social security number), a financial account identifier field 406 including a financial account identifier such as a credit or debit card number provided by the buyer, a buyer name field 408, and a contact information field 410 including buyer contact information. Examining, for example, record 402A, buyer Joe Smith is seen to have been assigned identifier 4567, to have provided credit card number 1111-1111-1111-1111 as a financial account identifier, and to have an electronic mail address of smith@aisp.com.

Referring now to FIG. 5, buyer offer database 500 is seen to include three data records 502A–502C. Each record is seen to include six data fields: a buyer offer identifier field 504 generated by central controller 200, a buyer identifier field 506 which corresponds to the buyer identifier in buyer database 400, a buyer offer conditions field 508 including conditions specified by the buyer, a price field 510 including a buyer-specified price, a submission date/time field 512 including the submission date of the buyer offer, and an expiration date/time field 514 including any buyer offer expiration date assigned by central controller 200 or by the buyer. Examining, for example, data record 502A, buyer offer "1" is seen to correspond to buyer "4567." The conditions are for an airline ticket: round-trip from New York to Los Angeles, leaving on "1/15/98" and returning on "1/19/98." The buyer-specified offer price is "$200," the date of submission of the buyer offer is "1/1/98," and the expiration date is "1/14/98." It is to be noted that data record 502B includes a second offer by the same buyer, this second offer having a changed departure date, price, and expiration date.

Figure 6A:
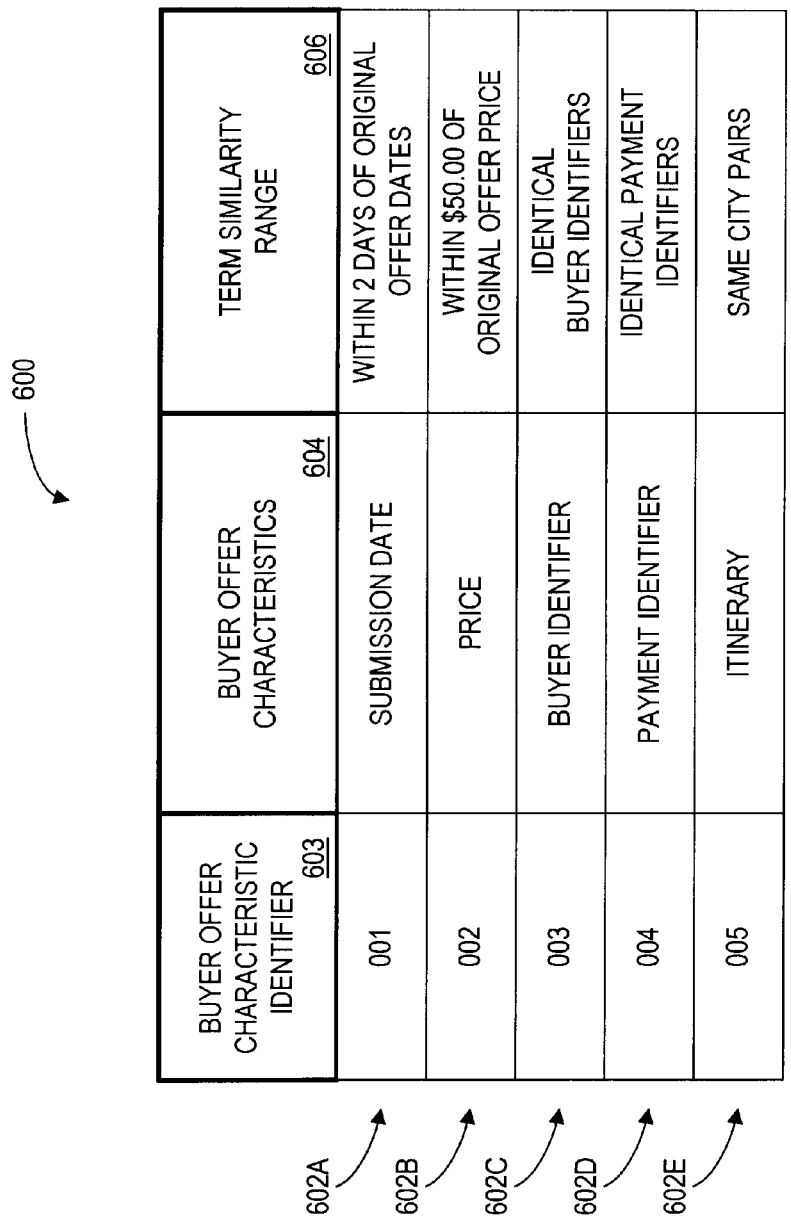
FIG. 6A is a table showing the data contents of an exemplary offer similarity range database.

With reference now to FIG. 6A, offer term database 600 stores unacceptable similarity ranges for selected offer terms, and is seen to include five records 602A–602E, each including three fields: an identifier field 603 constituting an index assigned by the system, a buyer offer characteristic field 604 including data identifying a buyer offer term, and a term similarity range field 606 containing a range for the corresponding term within which similar buyer offers may, in accordance with the rules described below, be rejected or differently processed. Examining, for example, data record 602A, it is seen that identifier "001" indexes buyer offer dates (field 604) submitted within two days of one-another (field 606).

Referring now to FIG. 6B, unacceptable similarity rules database 650 identifies selected combinations of term similarity ranges from database 600 which together are used to identify types of buyer offers which are to be rejected or otherwise differently processed. Database 650 is seen to include four records, 652A–D, each including two fields: a rule identifier field 654 constituting a rule number assigned by the system, and a term similarity range identifiers field 656 identifying, in Boolean logic format, what combination of term similarity ranges from field 606 of database 600 comprise an unacceptable buyer offer. That is, term similarity range identifiers 656 are used, in accordance with the processes set out and described below, to identify those buyer offers which are similar in nature and thus are likely to be operative to ping the system to identify price floors, so that such similar offers can be rejected or otherwise separately processed.

Examining in detail the rules set out in database 650, the rules identified in record 652A for identifier 001 are seen to identify a Boolean combination of terms from database 600. More specifically, the similarity range identifiers in this first rule are seen to identify the following combination of fields: 602C (and) 602B (and) 602E as constituting an unacceptable offer. Considering the corresponding term similarity range information from database 600, rule "001" is seen to identify offers that have: identical buyer identifiers (and) offers within $50.00 of one-another, (and) the same city pair. The remaining rules from database 650 are similarly examined in Table 1 below.

TABLE 1

| Unacceptable Rule Identifier | Term Similarity Range Identifiers |
|---|---|
| 002 | identical payment identifiers (and) prices within $50.00 (and) same city pairs |
| 003 | (identical buyer identifiers (or) identical payment identifiers) (and) (same city pairs (and) offers received within two days of one-another) |
| 004 | (identical buyer identifiers (or) identical payment identifiers) (and) (offer prices within $50.00 (and) same city pairs) |

For purposes of illustration and explanation, other combinations of offer terms that may identify system pings include, without limitation, two offers that are unacceptably similar in the range of: 1) dates and offer prices, 2) for an airline ticket, dates and itineraries, 3) for consumer products, offer prices and product specifications, 4) for consumer products, offer prices and brand specifications, 5) for hotel room accommodations, dates and locations, 6) for hotel room accommodations, locations and offer prices, 7) for financial products, financial terms and offer prices, 8) for airline tickets, date, itinerary and offer price, 9) for hotels, date, location, and offer price, 10) for hotels, date, location, offer price, and hotel rating, etc. It will be apparent to those skilled in the art that many different combinations of terms may be identified which would indicate that two related offers are functional to determine a confidential price floor, and upon the occurrence of unacceptably similar ranges for those terms, the second offer should be processed by an alternative process.

Referring now to FIG. 7A, a process 700 for utilizing the similarity rules in database 650 to determine how to process a buyer offer is shown, the first step 702 comprising receiving a buyer offer for processing. As described with respect to FIG. 1, in the present embodiment, the buyer offer is received into central controller 200 through an Internet communication. The buyer offer may include, for example, product specifications, fulfillment terms and conditions, and/or an offer price. It will be understood that the content of the buyer offer is particularly relevant to the present invention in its relation to previously submitted offers, more so than to the absolute contents of a particular offer. It will be further understood that, in the described embodiment, it is a rule requirement that compared offers are by the same buyer. As described above, this same buyer requirement is not necessary to all applications of the present invention.

The information contained in the received buyer offer is used to create a buyer record in buyer database 400 (step 704) and an offer record in offer database 500 (step 706). A search is then made of the buyer and offer databases to determine if a previous offer has been received from the same buyer (step 708).

It will be understood that one purpose of the present invention is to prevent pinging by a buyer(s) to determine a seller price floor. Accordingly, the terms "buyer," and/or "party," and/or equivalents, when used to refer to an entity capable of pinging the system to determine pricing information, may be identified in many different ways, including: the same (or a recognizably similar variation of) a: name, address, financial account identifier, telephone number, and/or geographic location (as may be determined, for example, by a global positioning system, telephone number, zip code, or the like). Other criteria for determining the existence of the "same" buyer may include the existence of a central controller-placed 'cookie' on a buyer's computer, and in appropriate circumstances similar offer terms and conditions such as product amenities, dates of offers, and/or price. Again, it will be understood that for the purpose of the present invention, a "buyer" is an entity who might repetitively ping central controller 200 to determine a floor price.

Many other criteria will be apparent to those skilled in the art by which such a buyer may be identified. It will be seen that, for purposes of illustration and explanation, two "same buyer" identifiers are set out in database 600: the same buyer identifier in field 602C, which may comprise, for example, the same buyer name or same buyer account identifier, and the same payment identifier as set out in field 602D, for example the same credit card account number.

If no previous offer has been received from the same buyer (step 710), the buyer offer is processed conventionally according to the steps set out in FIG. 8, described below (step 712).

If a previous offer has been received from the same buyer (step 710), then the rules in the similarity rules database are used to determine if the newly received offer is unacceptably similar in scope to the previous offer. This process is initiated by comparing the terms of the newly received offer to the terms of the previously received offer (step 714).

Figure 7B:
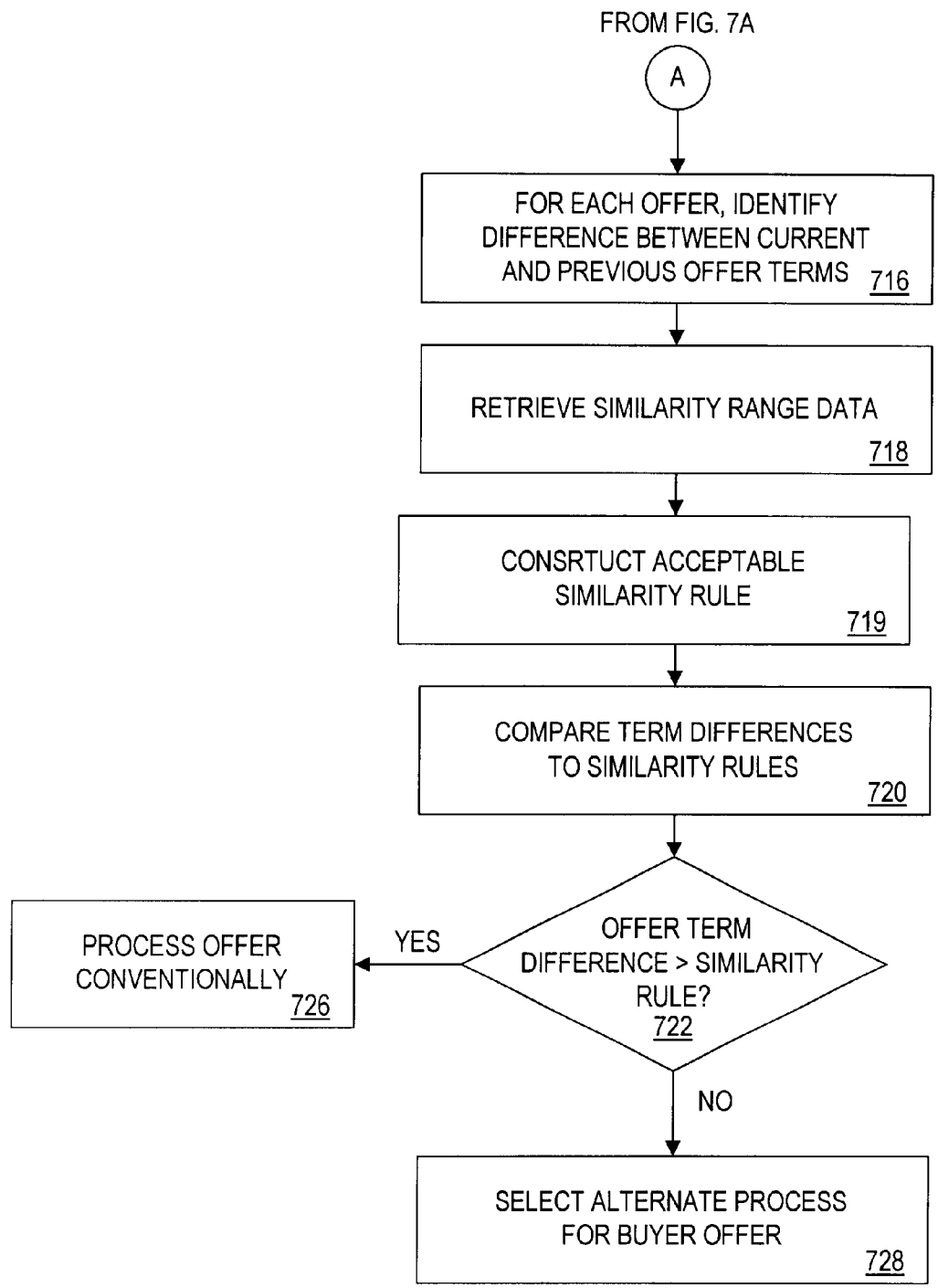

With reference now to FIG. 7B, for each offer, the difference between the current offer terms (excepting the buyer identifiers, which have been compared above) and the previous offer terms is determined (step 716). For purposes of explanation, if the terms being compared are price, the monetary difference between the prices of the current and previous offers are calculated. If the terms being compared are the buyer-requested date of service, the length of time between term dates is calculated. If product brands are specified, the product brand terms may be compared to determine if the specified brand has been altered. Appropriate difference ranges are determined for all selected offer terms, which may further include: offer dates, product specifications, fulfillment terms and conditions, specifications of selected sellers, etc.

For each buyer offer, the term similarity range identifiers, in Boolean form, are retrieved from field 656 of database 650, and used to retrieve the corresponding term similarity range data from field 606 of database 600 (step 718). This retrieved range data is used to construct the unacceptable similarity rule for the particular offer (step 719). It will be understood that different unacceptable similarity rules may be used for different business circumstances, depending on the particular rule identifier selected to index a record in database 650. Such decisions are to be determined by the system operator, and may be based on, for example, types of products being sold and/or business goals of the system operator and/or sellers. The actual difference between the current and previous offer terms are then compared to the unacceptable similarity rule data (step 720). If the actual offer term difference is outside of the unacceptable similarity rule range (step 722), i.e. the current offer is acceptable and not identified as a ping, then the current buyer offer is processed conventionally (step 726).

If the buyer offer test at step 722 is determined as having an unacceptable similarity to a previous offer, i.e. the offer term differences fall within the unacceptable similarity rule, then an alternate process is selected for the current buyer offer (step 728). In the described embodiment, the alternate process is to reject the current offer, thereby preventing pinging. It will be understood that other alternate processes may be selected which will also prevent or discourage pinging, such as: charging a surcharge to process the current offer, providing a warning to the buyer that this is the last similar offer that will be processed, and/or suspending future privileges of the buyer to use the system. Many other methods of processing such an offer while discouraging and preventing pinging will now be apparent to those of ordinary skill in the art.

With reference now to FIG. 8, a conventional process is shown for processing buyer offers that do not include unacceptably similar terms as determined by the similarity rules process 700 described above. To initiate process 800, a buyer offer is identified for conventional processing (step 802). That buyer offer is made available to remote sellers (also termed 'broadcast-based' sellers) (step 804) and compared to rules provided by rules-based sellers (also termed 'agency-based' sellers) (step 806). The step of making such an offer available to remote sellers may include, for example, transmitting the offer to the remote sellers electronically or by paper, and/or making the offer available for viewing by remote sellers, such as on an Internet website. The step of comparing such an offer to rules includes comparing the terms of the offer to rules of acceptance provided by a seller(s) for local processing and acceptance. Such rules, for example, may be collected and stored in a database in central controller 200.

It is next determined if any seller accepts the buyer offer (step 808). If neither of steps 804 or 806 identify an accepting seller, then the buyer is notified with a rejection of the offer (step 810). If an acceptance by a seller is identified in step 808, then the accepting seller is identified (step 812) and provided with the necessary buyer data (step 814). The buyer is likewise notified (step 816) of the acceptance, and provided necessary information relating to the seller.

There has thus been provided a new and improved method and system for processing buyer offers in a commerce system, and particularly in a buyer-driven commerce system, which discourages and/or prevents buyer pinging (i.e. the submission of multiple similar offers) to determine a seller floor price. The invention has application in buyer-driven commerce systems, and particularly in systems such as those provided by priceline.com. The invention is flexible enough to detect many different types of potential pinging strategies, and can be implemented so that it does not require undue resources.

While the present invention has been shown and described with respect to specific embodiments, it is not thus limited. Numerous modifications, changes and improvements falling within the scope of the invention will occur to those skilled in the art.

What is claimed is:

1. A method of using a computer to process offers for the purchase of products, comprising:

receiving from a party a first conditional purchase offer via said computer, said first conditional purchase offer including a plurality of offer terms each having a respective first value;

receiving from said party a second conditional purchase offer, said conditional purchase offer including said plurality of offer terms each having a respective second value;

said plurality of offer terms including a condition, a purchase price, a payment identifier, and an authorization to use said payment identifier to pay said purchase price;

determining for each of said plurality of offer terms an unacceptable similarity range;

comparing said respective first values with said respective second values for each of said offer terms;

if said respective first and second values for at least one of said plurality of offer terms fall within said unacceptable similarity range, performing a first process on said second offer; and if said respective first and second values for said plurality of offer terms do not fall within said unacceptable similarity range, performing a second process on said second offer, wherein performing a second process comprises transmitting said second offer to a plurality of sellers.

2. A method of using a computer to process offers for the purchase of products, comprising:

receiving from a party a first conditional purchase offer via said computer, said first conditional purchase offer including a plurality of offer terms each having a respective first value;

receiving from said party a second conditional purchase offer, said conditional purchase offer including said plurality of offer terms each having a respective second value;

said plurality of offer terms including a condition, a purchase price, a payment identifier, and an authorization to use said payment identifier to pay said purchase price;

determining for each of said plurality of offer terms an unacceptable similarity range;

comparing said respective first values with said respective second values for each of said offer terms;

if said respective first and second values for at least one of said plurality of offer terms fall within said unacceptable similarity range, performing a first process on said second offer; and if said respective first and second values for said plurality of offer terms do not fall within said unacceptable similarity range, performing a second process on said second offer, wherein performing a second process comprises querying a database to determine seller information.

3. A method of using a computer to process offers for the purchase of products, comprising:

receiving from a party a first conditional purchase offer via said computer, said first conditional purchase offer including a plurality of offer terms each having a respective first value;

receiving from said party a second conditional purchase offer, said conditional purchase offer including said plurality of offer terms each having a respective second value;

said plurality of offer terms including a condition, a purchase price, a payment identifier, and an authorization to use said payment identifier to pay said purchase price;

determining for each of said plurality of offer terms an unacceptable similarity range;

comparing said respective first values with said respective second values for each of said offer terms;

if said respective first and second values for at least one of said plurality of offer terms fall within said unacceptable similarity range, performing a first process on said offer, wherein performing a first process comprises using said payment identifier to charge said party a fee for processing said second offer; and if said respective first and second values for said plurality of offer terms do not fall within said unacceptable similarity range, performing a second process on said second offer.

4. A system for processing offers for a purchase of products, comprising:

a processor;

a memory connected to said processor and storing instructions for controlling said processor, said processor operative with said instructions to receive from a party a first conditional purchase offer, said first conditional purchase offer including plurality of offer terms each having a respective first value;

receive from said party a second conditional purchase offer, said second conditional purchase offer including said plurality of offer terms each having a respective second value;

said plurality of offer terms including a condition, a purchase price, a payment identifier, and an authorization to use said payment identifier to pay said purchase price;

determine for each of said plurality of offer terms an unacceptable similarity range;

compare said respective first values with aid respective second values for each of said offer terms;

if said respective first and second value for at least one of said plurality of offer terms fall within said unacceptable similarity range, perform a first process on said second offer; and if said respective first and second value for said plurality of offer terms do not fall within said unacceptable similarity range, perform a second process on said second offer, wherein performing a second process comprises transmitting said second offer to a plurality of sellers.

5. A system for processing offers for a purchase of products, comprising:

a processor;

a memory connected to said processor and storing instructions for controlling said processor, said processor operative with said instructions to receive from a party a first conditional purchase offer, said first conditional purchase offer including plurality of offer terms each having a respective first value;

receive from said party a second conditional purchase offer, said second conditional purchase offer including said plurality of offer terms each having a respective second value;

said plurality of offer terms including a condition, a purchase price, a payment identifier, and an authorization to use said payment identifier to pay said purchase price;

determine for each of said plurality of offer terms an unacceptable similarity range;

compare said respective first values with aid respective second values for each of said offer terms;

if said respective first and second value for at least one of said plurality of offer terms fall within said unacceptable similarity range, perform a first process on said second offer; and if said respective first and second value for said plurality of offer terms do not fall within said unacceptable similarity range, perform a second process on said second offer, wherein performing a second process comprises querying a database to determine seller information.

6. A system for processing offers for a purchase of products, comprising:

a processor;

a memory connected to said processor and storing instructions for controlling said processor, said processor operative with said instructions to receive from a party a first conditional purchase offer, said first conditional purchase offer including plurality of offer terms each having a respective first value;

receive from said party a second conditional purchase offer, said second conditional purchase offer including said plurality of offer terms each having a respective second value;

said plurality of offer terms including a condition, a purchase price, a payment identifier, and an authorization to use said payment identifier to pay said purchase price;

determine for each of said plurality of offer terms an unacceptable similarity range;

compare said respective first values with aid respective second values for each of said offer terms;

if said respective first and second value for at least one of said plurality of offer terms fall within said unacceptable similarity range, perform a first process on said second offer, wherein performing a first process comprises using said payment identifier to charge said party a fee for processing said second offer; and if said respective first and second value for said plurality of offer terms do not fall within said unacceptable similarity range, perform a second process on said second offer.

* * * * *

UNITED STATES PATENT AND TRADEMARK OFFICE
CERTIFICATE OF CORRECTION

PATENT NO. : 6,510,418 B1  Page 1 of 1
DATED : January 21, 2003
INVENTOR(S) : T Scott Case et al.

It is certified that error appears in the above-identified patent and that said Letters Patent is hereby corrected as shown below:

Column 6,
Line 14, please delete "smith@aisp.com" and insert therefor -- smith@isp.com --

Signed and Sealed this

Eighteenth Day of March, 2003

JAMES E. ROGAN
*Director of the United States Patent and Trademark Office*